United States Patent [19]

Stearns

[11] Patent Number: 5,087,933
[45] Date of Patent: Feb. 11, 1992

[54] IN SITU INONOGRAPHIC UNIFORMITY CORRECTION

[75] Inventor: Richard G. Stearns, Mountain View, Calif.

[73] Assignee: Xerox Corporation, Stamford, Conn.

[21] Appl. No.: 636,326

[22] Filed: Dec. 31, 1990

[51] Int. Cl.$^5$ .......................................... G01D 15/06
[52] U.S. Cl. .................................... 346/159; 346/155
[58] Field of Search ............ 346/154, 155, 159, 160.1; 355/225

[56] References Cited

U.S. PATENT DOCUMENTS

| | | | |
|---|---|---|---|
| 4,644,373 | 2/1987 | Sheridon et al. | 346/159 |
| 4,819,013 | 4/1989 | Beaudet | 346/159 |
| 4,972,212 | 11/1990 | Hauser et al. | 346/159 |
| 4,973,994 | 11/1990 | Schneider | 346/159 |

OTHER PUBLICATIONS

N. K. Sheridon, "Practical Air Assisted Inographic Printing", Proceedings, SPIE-The International Society For Optical Engineerings, vol. 1252, 13-14 Feb., 1990.

Primary Examiner—Benjamin R. Fuller
Assistant Examiner—Randy W. Gibson
Attorney, Agent, or Firm—Anglin & Giaccherini

[57] ABSTRACT

The In Situ Ionographic Uniformity Correction is a method and apparatus which solves the problem of non-uniform density of ion current projected from an ionographic print head (10) caused chiefly by variations in the dimensions of the modulation channel (24). During calibration, the present invention senses ion current (20) using a simplified ion sensor (36) which has an electrode (32), very large in proportion to the width of several modulation electrode (22). Groups (60), (61) of modulation electrodes (22) are electronically addressed in steps of one modulation electrode (22), each, across the width of the print array (16). To prevent cross-talk from rendering the sensed ion current (20) values unusable, the modulation voltage (Vm(i)) is adjusted by a feedback circuit (42) to achieve a fixed value of ion current (20) for each group (60), (61). Values of this modulation voltage (Vmi)) are stored in an electronic data file (44). Computation of corrected modulation voltage (Vm(i)') to produce uniform ion current (20), based on average modulation voltage and a print head (10) characteristic constant, is made in a data processor (46) by a programmed algorithm which accesses the data file (44). Corrected values of modulation voltage (Vm(i)') are applied to each correlated modulation electrode (22) through a switching circuit (52). Corrected values of modulation voltage a switching circuit (52). Corrected values of modulation voltage (Vm(i)'), when applied to the correlated modulation electrodes (22), produce ion currents (20) of uniform density and result in uniformity of density in large, grey printed areas.

14 Claims, 4 Drawing Sheets

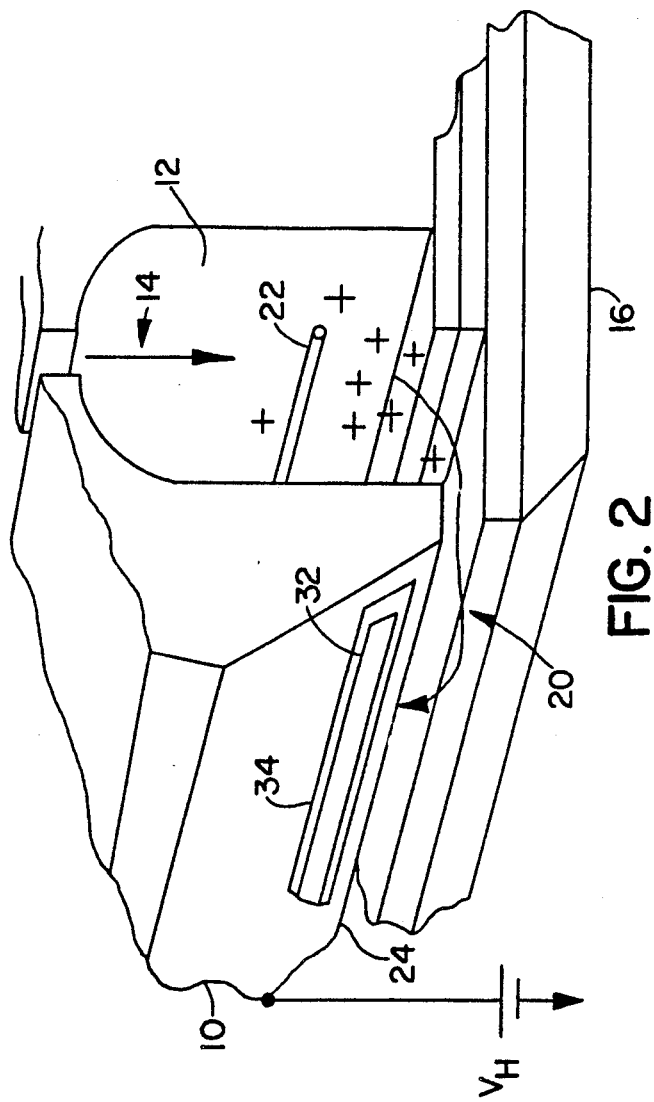

IN SITU IONOGRAPHIC UNIFORMITY CORRECTION

CROSS REFERENCE

Cross reference is made to U.S. Pat. No. 4,972,212, titled "METHOD AND APPARATUS FOR CONTROLLING ION TRAJECTORY PERTURBATIONS IN IONOGRAPHIC DEVICES", issued to Oscar G. Hauser, et al. and assigned to the same assignee as the present application, and to U.S. Pat. No. 4,973,994, titled "METHOD AND APPARATUS FOR CONTROLLING ION TRAJECTORY PERTURBATIONS IN IONGRAPHIC DEVICES", issued to Eric J. Schneider, and assigned to the same assignee as the present application.

Cross reference is also made to an Application for United States Letters Patent titled "FEEDBACK SCHEME FOR IONOGRAPHIC CALIBRATION", assigned to the same assignee as the present application and filed on Dec. 26, 1990.

INCORPORATION BY REFERENCE

The U.S. Patents referred to above as Cross References and U.S. Pat. No. 4,644,373 issued to Sheridon, et al. are all incorporated herein by reference.

BACKGROUND OF THE INVENTION

The present invention is a method and apparatus that provides a system for calibrating the ion current projected from an ionographic print head to achieve a uniform value. Uniformity of ion current under conditions of a known modulation voltage is important in producing high quality printed images, particularly those in which a large number of electrodes are driven to produce large grey areas. Non-uniform densities of ion current often result in unacceptable printed image density.

Ionographic printing is that type in which charged particles are created at a remote location from the point at which a charge latent image is formed on a dielectric surface of a conductive substrate receptor. A stream of ions, assisted in some known systems by a fluid stream, generally an air stream, passes through a channel in the print head in which is placed a linear array of modulation electrode fingers, one for each pixel in a line of the printed image. Ions are created in a chamber, for example, by electrical discharge from a corona wire, maintained at very high positive voltage. During the printing process, the stream of ions, or current, is projected toward the receptor, usually a drum, which is placed at a high, negative electrical potential so as to attract the ions to its dielectric surface. Those ions which are projected from the print head as a current are pulled to the dielectric, over-coated surface of the receptor where they form a charge image, ready for immediate Xerographic-type development into a printed image. Application of low, modulation voltages to the electrode fingers can deflect the ions and locally eliminate them from the current, producing varying densities of ions and thus varying density of the subsequently printed image.

In high-quality ionographic printing, particularly where grey-levels are used, unacceptable variations in the printed image density occur unless non-uniformities of ion current are corrected. Prior art has addressed the problem of controlling ion perturbation at the imaging surface caused by the effect of previously deposited ions on the path of subsequent ions directed toward the imaging surface. A U.S. Patent Application entitled "FEEDBACK SCHEME FOR IONOGRAPHIC CALIBRATION", filed Dec. 26, 1990 and assigned to the same assignee as the present application, discloses an array of calibration electrodes, each electrode associated with an opposing modulation electrode and coupled to the opposing modulation electrode through a feedback circuit which adjusts the ion current associated with the modulation electrode to a uniform value at a given value of modulation voltage. Such a device has sufficient spatial resolution to unambiguously measure the ion current associated with each individual modulation electrode. The calibrated modulation voltages for the print head are stored for later use during printing or used in real time depending on the speed of printing desired. As used herein, "calibrating" is the process of making the ion stream uniform for a desired value of modulation voltage. The referenced device would likely occupy space between the print head and the receptor. It requires a large number of individual feedback circuits, possibly as many as the number of modulation electrodes, depending on the design of the print head and associated multiplexing circuits for addressing the modulation electrodes.

The problems of eliminating mechanical scanning and of rapidly calibrating a large array of modulation electrodes in an ionographic head have been major ones for designers of ionographic printing devices. It would be a major technological advance to provide a simpler way to eliminate the problems of mechanical scanning a large array of modulation electrodes in an ionographic head, at a low cost, and particularly if the device could be easily mounted directly to the print head. The development of such a direct way to insure uniform ion flow in spite of variations in the construction of ionographic printing heads would fill a long felt need in electronic printing.

SUMMARY OF THE INVENTION

The In Situ Ionographic Uniformity Correction system is a method and apparatus which solves the problem of non-uniform density of ion current flowing from an ionographic print head using a simplified, head-mounted ion sensor and a correction algorithm applied in a data processor. Non-uniformities are caused chiefly by manufacturing variations in the dimensions of the print head channel.

The present invention senses the ion current flow associated with modulation voltage applied to small groups of modulation electrodes, using a low spatial resolution ion sensor which has an electrode that is very large in proportion to the width of several modulation electrodes. The groups are electronically addressed, traversing the width of the print array in steps of one modulation electrode each. The ion sensor electrode is negatively biased at a high level which attracts the ions projected from the print head. To prevent modulation electrode cross-talk from rendering the sensed ion current values unusable because such a large electrode is used to collect them, the modulation voltage is adjusted for each modulation group by a feed back circuit until a fixed value of ion current is achieved. Individual modulation electrode-group values of this modulation voltage are measured and maintained in an electronic data file. A correction is then made by a programmed algorithm to achieve the value of modulation voltage required at each modulation electrode to produce uniform ion current as if sensed by a high spatial resolution ion sensor, that is, one which would accurately measure ion current from only one modulation electrode. The correction is determined by algorithm based on the average modulation voltage and a characteristic constant of the print head. The appropriate correction factor is applied sequentially to each related modulation voltage value and corrected values of modulation voltage are stored in the data file. The corrected voltages are then applied to an assigned modulation electrode through the circuit drivers which modulate the print array. Assignment may be made to one or more modulation electrodes in each group. Corrected values of modulation voltage, when applied to the correlated modulation electrodes, produce ion currents of uniform ion density at each modulation electrode position and result in uniformity of density in large, grey printed areas.

An appreciation of other aims and objectives of the present invention and a more complete understanding of this invention may be achieved by studying the following description of a preferred embodiment and by referring to the accompanying drawings.

BRIEF DESCRIPTION OF THE DRAWINGS

FIG. 2 is a perspective view of a calibration electrode, used in the In Situ Uniformity Correction system, arranged on an ionographic print head.

DETAILED DESCRIPTION OF A PREFERRED EMBODIMENT

Figure 1A:
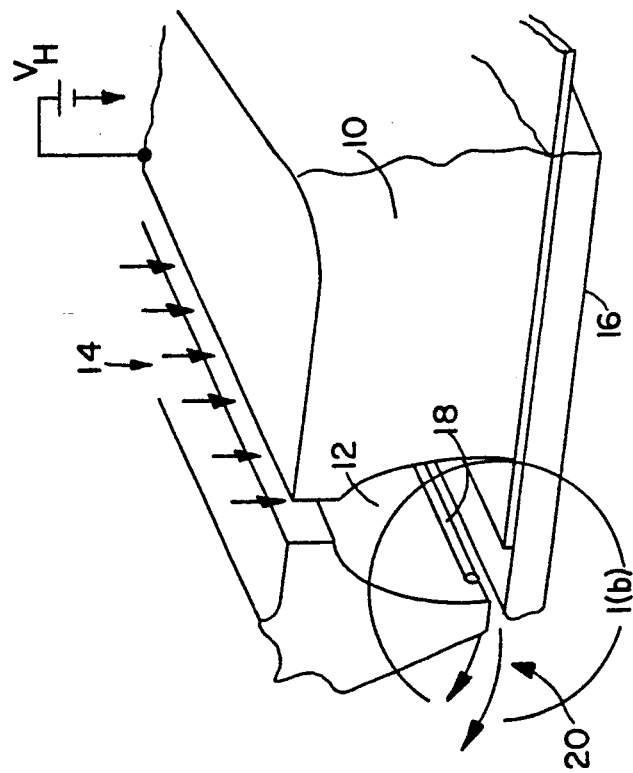
FIGS. 1(a,b) are perspective views of an ionographic print head.

FIGS. 1(a,b) show perspective views depicting the general arrangement of an ionographic print head (10) of a fluid jet assisted marking apparatus similar to that described in commonly assigned U.S. Pat. No. 4,644,373 to Sheridon et al. Within head (10) is an ion generation region including an ion chamber (12) and a corona wire (18), supported within the chamber and supplied with a high potential on the order of several thousand volts D.C. The corona discharge around corona wire (18) creates a source of ions of a given polarity (preferably positive) which are attracted to the chamber wall held at a potential of $V_H$, and fill the chamber with a space charge.

A pressurized transport fluid (14), preferably air, from a suitable source is introduced to the ion chamber (12). A modulation channel (24) directs the transport fluid (14) out of the chamber (12). As the transport fluid (14) passes through the ion chamber (12) it entrains ions and moves them into the modulation channel (24) past modulation electrodes (22). During the printing process, ions are allowed to pass out of the head (10), through the modulation channel (24) and are directed toward a receptor dielectric surface where they form a charge image, ready for Xerographic-type development into a printed image. To form an image, the modulation electrodes (22) are individually switched to locally eliminate ions from the ion stream. The resultant ion current (20) is attracted to the receptor. The switching arrangement may produce a binary image, for example black and white, or grey levels may be introduced by providing a continuously variable modulation voltage to the modulation electrodes (22). The modulation electrodes (22) are arranged in a print array (16), constructed as a thin film layer supported by an insulating substrate.

Figure 3:
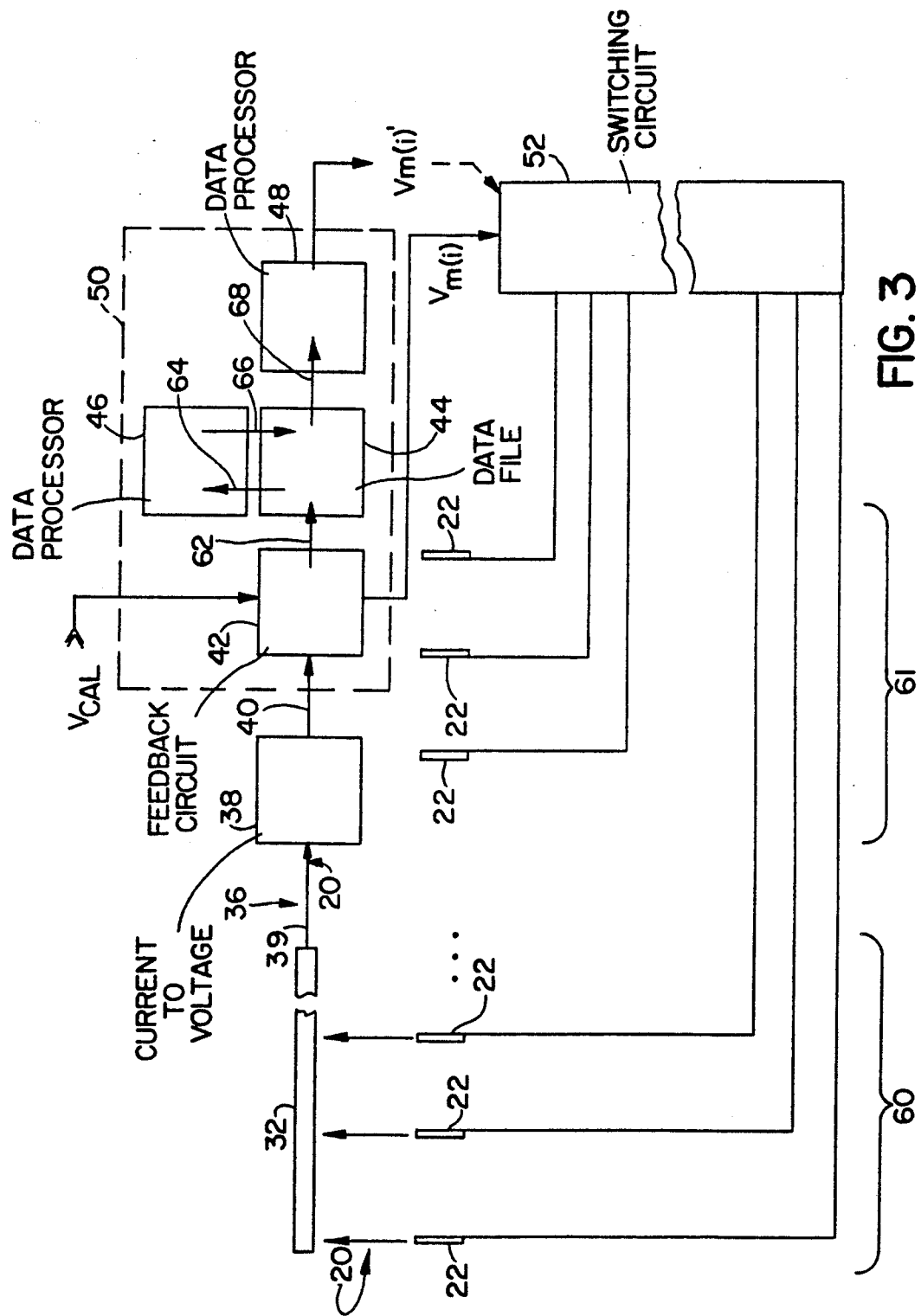
FIG. 3 is a schematic diagram of the In Situ Ionographic Uniformity Correction system with the feedback loop operating.
Figure 4:
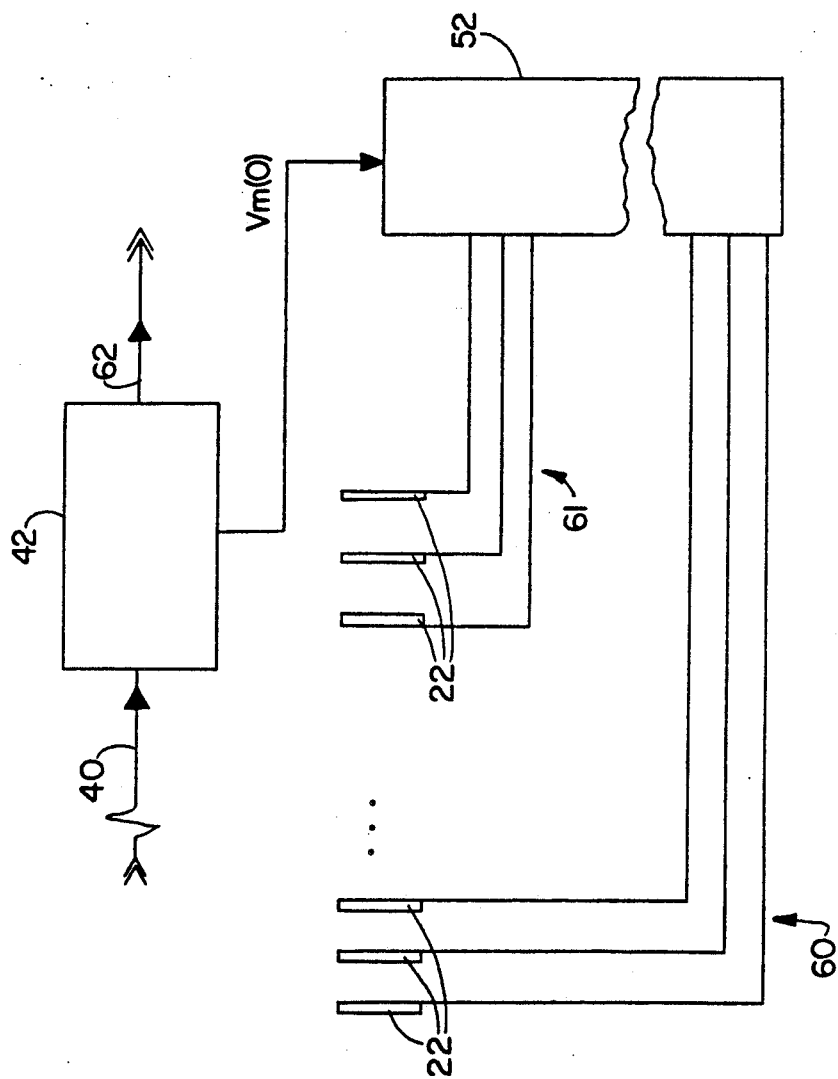
FIG. 4 is a schematic diagram of the feedback and switching circuit portion of the In Situ Ionographic Uniformity system with a fixed modulation calibration voltage applied to the modulation electrodes.

Referring now to FIGS. 2, 3 and 4, FIG. 2 is a perspective view of the general arrangement of a calibration electrode (32), employed in the ion sensor (36) of the In Situ Uniformity Correction system, mounted on an ionographic print head (10). FIG. 3 depicts schematically the In Situ Uniformity Correction system with the feedback circuit (42) in a closed loop condition. FIG. 4 depicts schematically a portion of the system with the feedback circuit in an open loop condition. The calibration electrode (32) is a strip of metal, preferably copper, patterned on a mylar strip (34) which in turn is adhered directly to the print head (10). The calibration electrode (32) has a length dimension which is much larger than the width dimension of several modulation electrodes (22) and is positioned adjacent to and in alignment with the lengthwise dimension of the modulation channel (24). Several calibration electrodes (32) may be employed in parallel to enhance the speed of calibration. During calibration, the calibration electrode (32) is biased with a high negative voltage with respect to the head (10), of the order of 600 to 800 volts D.C. All ions leaving the head (10) are collected at the calibration electrode (32). The resulting ion current (20) is detected by current-to-voltage device (38). Ideally, only one modulation electrode (22) at a time would be "printed", that is modulated to allow a flow of ion current (20). In addition, it is valuable to modulate the modulation electrode (22) in such a way that a differential measurement of ion current (20) can be made. Such measurement allows any residual background or leakage current to be subtracted from the resulting ion current (20). To measure ion current (20) across the entire head (10) it is necessary to sequentially address modulation electrodes (22) electronically, applying a modulation voltage ($V_m(i)$). Because an ion sensor (36) with a very large calibration electrode (32) is used, the measurement system can be made quite cheaply and the detection can be quite rapid. It has been found that ion current (20) associated with one modulation electrode (22), surrounded by modulation electrodes which are "turned off", that is biased by a modulation voltage which blocks the ion current (20) associated with those electrodes (22), is approximately 20 percent of the current (20) that would be measured by a high resolution detector when all modulation electrodes (22) are printed together, for example, when printing a grey area. For this reason it is often found to be more practical to calibrate a contiguous group of modulation electrodes (22), for example three to ten in a group (60), (61), stepping this group by one modulation electrode (22) for each new measurement of ion current (20). At the same time, all other modulation electrodes (22) in the array (16) are turned off. This approach allows more signal for the ion current (20) measurement. Such an approach, of course, degrades spatial measurement since each measurement of ion current data (40) has contributions from more than one modulation electrode (22). It has also been observed that as a result of electrode (22) cross-talk, measured non-uniformity of ion current (20) across the head (10) becomes greater when a large ion sensor (36) is used for small groups of electrodes than when a high resolution sensor is used and all electrodes are modulated to the same level. Because of these effects, the present invention employs an algorithm, electronically applied to correct modulation voltage (Vm(i)) data in a control and processing unit (50). In an alternate embodiment, a similar type algorithm is electronically applied to ion current data (40). The control and processing unit (50) may be configured from a conventional computer using appropriate software. The two approaches to producing uniform ion current (20) are discussed herein, however, there may be others similar in character and it is not intended that this discussion limit the invention.

The first approach, schematically shown in FIG. 3 produces a uniform ion current (20) when measured with the ion sensor (36). In the preferred embodiment, three modulation electrodes (22) are selected as members of each electrode group (60), (61). Each modulation electrode (22) is addressed through a switching circuit (52) of conventional design, step-wise, one modulation electrode (22) at a step, beginning with a first group (60) and ending with a last group (61) of modulation electrodes (22). A plurality of desired values of calibration reference voltage ($V_{CAL}$) are selected for calibration purposes and supplied, one at a time, as a comparative voltage to a feedback circuit (42). The feedback circuit adjusts the modulation voltage (Vm(i)) supplied to the switching circuit (52), and thereby to each respective modulation electrode (22), to achieve a uniform, measured value of ion current (20). Simultaneously, to all modulation electrodes (22) which are not being addressed, a maximum value of modulation voltage is supplied which "turns off" or blocks the ion current (20) from those electrodes (22). Each ion current (20) associated with each modulation electrode (22) being addressed is measured by the ion sensor (36). Corresponding values of modulation voltage (Vm(i)), determined by the feedback circuit to be required to produce uniform ion current (20) at each modulation electrode, are also measured and stored in an electronic data file (44) through an electronic coupling (62). A programmed algorithm is applied through electronic coupling (64) to each value of modulation voltage (Vm(i)) in the data file (44), in turn, by a first data processor (46), to obtain a plurality of values of corrected modulation voltage (Vm(i)') one for each value of calibration modulation voltage (Vm(i)) associated with each said modulation electrode (22). The algorithm mechanizes Equation 1, where Vm(avg) is $\Sigma Vm(i)/N$, N being the number of modulation electrodes (22) in the print array (16) and k is an empirically determined constant, characteristic of a general type of print head (10):

$$Vm(i)' = Vm(avg) + k \cdot (Vm(i) - Vm(avg)) \quad \text{(Equation 1)}$$

Each value of corrected modulation voltage (Vm(i)') is returned by electronic coupling (66) to be stored in the data file (44). Retrieval of each value of corrected modulation voltage (Vm(i)') from the data file (44) is made through an electronic coupling (68) by a second data processor (48). Applying each value of corrected modulation voltage (Vm(i)') to each respective modulation electrode (22) associated therewith, adjusts the ion current (20) at each modulation electrode (22) to a uniform value for each desired value of modulation voltage (Vm(i)).

An alternative approach is faster than the first approach above. Although somewhat less precise, with iteration it would produce the same results. As in the first approach above, the modulation electrodes (22) are addressed in like manner. However, instead of achieving uniform ion current (20) during calibration, a fixed value of calibration modulation voltage (Vm(0)) is applied to each modulation electrode through the switching circuit (52) as shown in FIG. 4, replacing the adjustable modulation voltage (Vm(i)), all non-addressed modulation electrodes (22) are turned off, and the resulting ion current (20) measured. In this case, ion current data (40) indicative of ion current (20) is collected and stored in the electronic data file (44). Application of a programmed algorithm to the stored values of ion current data (40) obtains a plurality of corrected modulation voltages (Vm(i)') and is accomplished by transfer of data through electronic coupling (62), (64). The algorithm in the alternative embodiment mechanizes Equation 2, where I(i) is the modulation current (20) associated with each modulation electrode (22) when a calibration modulation voltage of Vm(0) is applied to the modulation electrodes addressed, I(avg) is $\Sigma I(i)/N$, N being the number of modulation electrodes (22) in the array (16), and $\alpha$ is an empirically determined constant, characteristic for a general type of print head (10):

$$Vm(i)' = Vm(0) + \alpha \cdot (I(i) - I(avg)) \quad \text{(Equation 2)}$$

As in the first approach, each value of corrected modulation voltage (Vm(i)') is returned by electronic coupling (66) to be stored in the data file (44), retrieval of each value of corrected modulation voltage (Vm(i)') from the data file (44) is made through electronic coupling (68), by the second data processor (48) and applying each value of corrected modulation voltage (Vm(i)') to each respective modulation electrode (22) associated therewith, adjusts the ion current (20) at each modulation electrode (22) to a uniform value for each desired value of calibration modulation voltage (Vm(0)).

Although the present invention has been described in detail with reference to a particular preferred embodiment, persons possessing ordinary skill in the art to which this invention pertains will appreciate that various modifications and enhancements may be made without departing from the spirit and scope of the claims that follow.

LIST OF REFERENCE NUMERALS

Figure 1B:
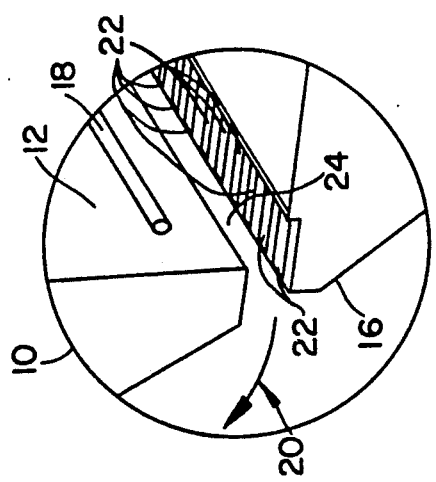

FIG. 1(a)
10 Print head
12 Ion chamber
14 Air flow
16 Print array
18 Corona wire
20 Ion current
$V_H$ Print head potential
FIG. 1(b)
10 Print Head
12 Ion chamber
16 Print array
18 Corona wire
20 Ion current
22 Modulation electrode
24 Modulation channel
FIG. 2
10 Print head
12 Ion chamber
14 Air flow
16 Print array 20 Ion current
22 Corona wire
24 Modulation channel
32 Calibration electrode
34 Insulating strip
$V_H$ Print head potential
FIG. 3
20 Ion current
22 Modulation electrode
36 Ion sensor
38 Current-to-voltage device
39 Ion current input line
40 Ion current data
42 Feedback circuit
44 Data file
46 First data processor
48 Second data processor
50 Control and processing unit
52 Switching circuit
60 First group of modulation electrodes
61 Last group of modulation electrodes
62 Ion current and modulation voltage data transfer coupling
64 Ion current and modulation voltage data transfer coupling
66 Corrected modulation voltage data transfer coupling
68 Corrected modulation voltage data readout coupling
$V_{CAL}$ Calibration reference voltage
Vm(i) Modulation voltage
Vm(i)' Corrected modulation voltage
FIG. 4
22 Modulation electrode
40 Ion current data
42 Feedback circuit
52 Switching circuit
60 First group of modulation electrodes
61 Last group of modulation electrodes
62 Ion current and modulation voltage data transfer coupling
Vm(0) Calibration modulation voltage

What is claimed is:

1. In combination with an ionographic print head (10) apparatus having a source of ions moving in a stream through a modulation channel (24) in which a print array (16) of modulation electrodes (22) is positioned and individually biased by a modulation voltage (Vm(i)) to modulate said stream projected from said print head (10) as an ion current (20) to form a charge image on a dielectric surface of an electroreceptor, the improvement for correcting in situ, non-uniformity of said ion current (20) which comprises:

an ion sensing means (36) for sensing values of said ion current (20) associated with one or more said modulation electrodes (22);

a switching means (52) for addressing each one of said modulation electrodes (22) in said print array (16), and applying said modulation voltage (Vm(i)), respectively, to each of said modulation electrodes (22), said addressing of said modulation electrodes (22) being arranged by group (60), (61); and a data processing means (50) for constructing by algorithm, storing and retrieving a plurality of values of corrected modulation voltage (Vm(i)') associated with each value of said modulation voltage (Vm(i)) which produces a predetermined, uniform value of ion current (20), associated with each of said modulation electrodes (22), and a plurality of values of corrected modulation voltage (Vm(i)') associated with each said value of ion current (20) achieved when said modulation voltage (Vm(i)) is fixed at a uniform, predetermined value (Vm(0));

said ion sensing means (36) being positioned to intercept all of said ion current (20), projected from said print head (10), associated with one or more said modulation electrodes (22), and having an output of a stream of ion current data (40), said data processing means (50) being coupled to said switching means (52) and to said data processing means (50).

2. An apparatus as claimed in claim 1 in which said ion sensing means (36) comprises:

a negatively-biased calibration electrode (32) much greater in length than a width dimension across several of said modulation electrodes (22), said calibration electrodes (32) being affixed to said print head (10) adjacent to and aligned along a lengthwise dimension of said modulation channel (24), and insulated therefrom; and a current-to-voltage conversion device (38);

said calibration electrode (32) being sufficiently charged to attract all of said ion current (20) projected from said print head (10) associated with said modulation electrodes (22) being modulated by said modulation voltage (Vm(i)), and connected so as to conduct said ion current (20) to said current-to-voltage conversion device (38).

3. An apparatus as claimed in claim 1 in which said switching means (52) comprises a switching circuit for addressing and modulating each said modulation electrode (22) step-wise, one said modulation electrode (22) at a step, beginning at a first group (60) and ending at a last group (61) of said modulation electrodes (22), said switching circuit being programmed to address and modulate each of said modulation electrodes (22) of said first group (60) with said modulating voltage (Vm(i)) and simultaneously to modulate all said modulation electrodes (22) not being addressed with a maximum value of modulation voltage to block said ion current (20) therefrom, and then to proceed step-wise, one modulation electrode (22) at a step, until said last group (61) has been addressed and modulated with said modulation voltage (Vm(i)).

4. An apparatus as claimed in claim 1 in which said data processing means (50) comprises:

a feedback means (42) for adjusting each value of said modulation voltage (Vm(i)) to obtain a desired value of ion current (20) at each of said modulation electrodes (22);

an electronic data storage means (44) for storing each value of said modulation voltage (Vm(i)), each associated value of said ion current data (40) and an identification of each associated modulation electrode (22);

a correction means (46) for producing values of corrected modulation voltage (Vm(i)'); and a retrieval means (48) for retrieving said values of corrected modulation voltage (Vm(i)');

said feedback means (42) being coupled at an input to said sensing means (36), and being coupled at a first output to said switching means (52) and at a second output to said storage means (44), and having as an input a desired value of calibration reference voltage ($V_{CAL}$);

said correction means (46) having a programmed first algorithm, said first algorithm applied through an electronic coupling (64), to each value of said modulation voltage (Vm(i)) and having a programmed second algorithm, said second algorithm applied to each value of said ion current data (40) stored in said electronic data storage means (44), to produce a plurality of values of said corrected modulation voltage (Vm(i)') which are stored in said data storage means (44) through an electronic coupling (66), and retrieved for later use in the printing process by said retrieval means (48), said retrieval means (48) being coupled to said data storage means (44) and to said switching means (52).

5. An apparatus as claimed in claim 4 in which said feedback means (42) comprises a conventional feedback loop circuit having a switch to open said feedback loop.

6. An apparatus as claimed in claim 4 in which said data storage means (44) comprises an electronic data file controlled by programmable computer software.

7. An apparatus as claimed in claim 4 in which said correction means (46) comprises an electronic data processor, controlled by programmable computer software.

8. An apparatus as claimed in claim 4 in which said retrieval means (48) comprises an electronic data processor, controlled by programmable computer software.

9. In combination with an ionographic print head (10) apparatus having a source of ions moving in a stream through a modulation channel (24) in which a print array (16) of modulation electrodes (22) is positioned and individually biased by a modulation voltage (Vm(i)) to modulate said stream, projected from said print head (10) as an ion current (20) to form a charge image on a dielectric surface of an electroreceptor, the improvement for correcting in situ, non-uniformity of said ion current (20), which comprises:

an ion sensor (36) having a negatively-biased calibration electrode (32) much greater in length than a width dimension across several of said modulation electrodes (22), said calibration electrode (32) being affixed to said print head (10) adjacent to and aligned along a lengthwise dimension of said modulation channel (24), and insulated therefrom, to intercept all of said ion current (20) associated with one or more of said modulation electrodes (22) being modulated as a group (60), (61);

a current-to-voltage conversion device (38) having an ion current input line (39), being connected to said calibration electrode (32), and having an output of ion current data (40);

a feedback circuit (42) having an input coupled to an output of said current-to-voltage device (38), and having a first output coupled to said switching circuits (52) and a second output coupled to said storage means (44), and having a selected input of desired values of calibration reference voltage (VCAL);

a switching circuit (54) programmed to address and modulate each one of said modulation electrodes (22), step-wise, one of said modulation electrodes (22) at a step, beginning with a first group (60) and ending with a last group (61) of said modulation electrodes (22), said switching circuit programmed to modulate each of said modulation electrodes (22) of said first group (60) with said modulation voltage (Vm(i)) and simultaneously to modulate all said modulation electrodes (22) not being addressed with a maximum value of modulation voltage to block said ion current (20) therefrom, and then to proceed step-wise, one modulation electrode (22) at a step, until said last group (61) has been addressed and modulated with said modulation voltage (Vm(i));

an electronic data storage file (44), programmed by computer software, in which to store each value of said modulation voltage (Vm(i)) and each associated value of said ion current data (40) and an identification of each associated one of said modulation electrodes (22);

an electronic data processor (46), being coupled to said electronic data storage file (44) by an electronic coupling (64), (66) and programmed to apply a first correction algorithm to each value of said modulation voltage (Vm(i)) stored in said electronic data storage file (44), and programmed to apply a second correction algorithm to each said value of ion current data (40) stored in said electronic data storage file (44), each said correction algorithm producing a corresponding value of corrected modulation voltage (Vm(i)'); and an electronic data processor (48) programmed to retrieve each value of said corrected modulation voltage (Vm(i)') and apply said corrected modulation voltage (Vm(i)') to each correlated modulation electrode (22).

10. A method of correcting in situ the non-uniformity of density of an ion flow from an ionographic print head (10) having a source of ions moving in a stream through a modulation channel (24) in which a print array (16) of modulation electrodes (22) is positioned and individually biased by a modulation voltage (Vm(i)) to modulate said stream, projected from said print head (10) as an ion current (20) to form a charge image on a dielectric surface of an electroreceptor, comprising the steps of:

sensing said ion current (20) with an ion sensing means (36) positioned with respect to one or more said modulation electrodes (22) to intercept all of said ion current (20) associated with said modulation electrodes (22) and producing a data output (40) indicative of each value of said ion current (20) sensed;

applying a value of modulation voltage (Vm(i)) to each of said modulation electrodes (22) in said print array (16) and feeding back said ion current data (40) through a feedback circuit (42) to adjust each value of said modulation voltage (Vm(i)) to produce a desired, uniform value of said ion current (20) associated with each of said modulation electrodes (22);

constructing by a first algorithm and storing a plurality of values of corrected modulation voltage (Vm(i)') for each said value of modulation voltage (Vm(i)) associated with each uniform value of said ion current (20) and constructing by a second algorithm and storing a plurality of values of corrected modulation voltage (Vm(i)') for each said value of ion current associated with a fixed value of calibration modulation voltage (Vm(0);) and retrieving said values of corrected modulation voltage (Vm(i)') for each desired value of modulation voltage (Vm(i)) and applying each of said values of corrected modulation voltage (Vm(i)') to each correlated modulation electrode (22), thereby adjusting said ion current (20) associated with each modulation electrode (22) to a uniform value.

11. A method of correcting in situ the non-uniformity of density of an ion flow from an ionographic print head

(10) having a source of ions moving in a stream through a modulation channel (24) in which a print array (16) of modulation electrodes (22) is positioned and individually biased by a modulation voltage (Vm(i)) to modulate said stream, projected from said print head (10) as an ion current (20) to form a charge image on a dielectric surface of an electroreceptor, comprising the steps of:

positioning a calibration electrode (32) having a high, negative bias and a length dimension much greater than a width dimension across several of said modulation electrodes (22), adjacent to and aligned along a length dimension of said modulation channel (24), and insulated therefrom;

addressing each one of said modulation electrodes (22) step-wise, one of said modulation electrodes at a step, beginning with a first group (60) and ending with a last group (61) of modulation electrodes (22), applying a desired value of said modulation voltage (Vm(i)) for calibration purposes, and applying simultaneously to all said modulation electrodes (22) which are not being addressed, a value of modulation voltage which blocks the ion current (20) therefrom;

sensing said ion current (20) with said calibration electrode (32), conducting said ion current (20) to a current-to-voltage conversion device and producing an ion current data output (40) indicative of each value of said ion current (20) sensed;

supplying said ion current data output (40) to a feedback circuit (42) and adjusting said modulation voltage (Vm(i)) by action of said feedback circuit (42) until a fixed value of said ion current (20) is achieved;

measuring, in turn, each one of said modulation voltage (Vm(i)) associated with each said modulation electrodes (22) being addressed and storing each value of said modulation voltage (Vm(i)) in an electronic data storage file (44) with a correlated identification of one of said modulation electrodes (22);

applying a programmed algorithm to each value of said modulation voltage (Vm(i)) in said electronic storage data file (44), in turn, and obtaining a value of corrected modulation voltage (Vm(i)') for each value of said modulation voltage (Vm(i)) correlated with each of said modulation electrodes (22);

storing each said value of corrected modulation voltage (Vm(i)') in said electronic data storage file (44);

retrieving each value of said corrected modulation voltage (Vm(i)') for each desired value of said modulation voltage (Vm(i)) from said electronic data storage file (44) and applying each value of said corrected modulation voltage (Vm(i)') to each correlated modulation electrode (22) associated therewith, thereby adjusting said ion current (20) associated with each said modulation electrode (22) to a uniform value.

12. A method of correcting in situ the non-uniformity of density of an ion flow from an ionographic print head (10) having a source of ions moving in a stream through a modulation channel (24) in which a print array (16) of modulation electrodes (22) is positioned and individually biased by a modulation voltage (Vm(i)) to modulate said stream, projected from said print head (10) as an ion current (20) to form a charge image on a dielectric surface of an electroreceptor, comprising the steps of:

positioning a calibration electrode (32) having a high, negative bias and a length dimension much greater than a width dimension across several of said modulation electrodes (22), adjacent to and aligned along a length dimension of said modulation channel (24), and insulated therefrom;

addressing each one of said modulation electrodes (22) step-wise, one modulation electrode at a step, beginning with a first group (60) and ending with a last group (61) of modulation electrodes (22), applying a desired fixed value of calibration modulation voltage (Vm(0)), for calibration purposes, achieving a corresponding value of said ion current (20), and applying simultaneously to all said modulation electrodes (22) which are not being addressed, a maximum value of modulation voltage which blocks said ion current (20) therefrom;

sensing said ion current (20) with said calibration electrode (32), conducting said ion current (20) to a current-to-voltage conversion device and producing an output of ion current data (40) indicative of each value of said ion current (20) sensed;

storing each value of said ion current data (40) in an electronic data storage file (44) correlated with said fixed value of calibration voltage (Vm(0)) and correlated with an identification of each one of said modulation electrodes (22);

applying a programmed algorithm to each said value of said ion current data (40) in said electronic data storage file (44), in turn, and obtaining a value of corrected modulation voltage (Vm(i)') for each said fixed value of modulation voltage (Vm(0)) applied to each one of said modulation electrodes (22);

storing each said value of corrected modulation voltage (Vm(i)') in said data file (44);

retrieving each value of said corrected modulation voltage (Vm(i)') for each desired value of said calibration modulation voltage (Vm(0)) from said electronic data file (44) and applying each value of said corrected modulation voltage (Vm(i)') to each correlated modulation electrode (22), thereby adjusting said ion current (20) associated with each said modulation electrode (22) to a uniform value.

13. A method of correcting in situ the non-uniformity of density of an ion flow from an ionographic print head (10) having a source of ions moving in a stream through a modulation channel (24) in which a print array (16) of modulation electrodes (22) is positioned and individually biased by a modulation voltage (Vm(i)) to modulate said stream, projected from said print head (10) as an ion current (20) to form a charge image on a dielectric surface of an electroreceptor, comprising the steps of:

providing an ion sensor (36) having a negatively-biased calibration electrode (32), said calibration electrode (32) having a length dimension much greater than a width dimension across several of said modulation electrodes (22), being positioned adjacent to and aligned along a length dimension of said modulation channel (24), and insulated therefrom;

providing a current-to-voltage conversion device (38) having an ion current input line (39) and having an output of ion current data (40), said ion current input line (39) being connected to said calibration electrode (32);

providing a switching circuit (52) programmed to address and modulate each of said modulation electrodes (22);

providing an electronic data storage file (44), programmed by computer software, in which to store each value of modulation voltage (Vm(i)), an associated value of ion current date (20) and identification of correlated modulation electrode (22);

providing a feedback circuit (42) having an input coupled to said output of said current-to-voltage device (38), and having a first output coupled to said switching circuit (52) and a second output coupled to said electronic data storage file (44), and having as an input a desired value of calibration reference voltage ($V_{CAL}$);

providing an electronic data processor (46), coupled to said electronic data storage file (44) and programmed to apply a correction by a correction algorithm to each said modulation voltage (Vm(i)) stored in said electronic data storage file (44), each said correction producing a corresponding value of said corrected modulation voltage (Vm(i)'); and providing an electronic data processor (48) programmed to retrieve said values of corrected modulation voltage (Vm(i)');

addressing each of said modulation electrodes (22) through said switching circuit (52), step-wise, one modulation electrode at a step, beginning with a first group (60) and ending with a last group (61) of modulation electrodes (22), applying a desired value of said modulation voltage (Vm(i)) for calibration purposes and simultaneously modulating all other said modulation electrodes (22) not being addressed with a maximum value of modulation voltage to block said ion current (20) therefrom, and traversing said print array (16) step-wise, one said modulation electrode (22) at a step, until said last group (61) has been addressed and modulated with said modulation voltage (Vm(i));

sensing said ion current (20), associated with one or more of said modulation electrodes (22) being modulated by said modulation voltage (Vm(i),) with said calibration electrode (32), conducting said ion current (20) to said current-to-voltage conversion device (38) and producing an ion current date (40) output indicative of each value of said ion current (20);

supplying said feedback circuit (42) with said ion current data (40) and adjusting said modulation voltage (Vm(i)) by action of said feedback circuit (42) until a fixed value of said ion current (20) is achieved;

measuring, in turn, each said modulation voltage (Vm(i)) associated with each fixed value of said ion current (20) and with each one of said modulation electrodes (22) being addressed and storing each value of said modulation voltage (Vm(i)) correlated with each one of said modulation electrodes (22) in an electronic data file (44);

applying a programmed algorithm in said electronic data processor (46) to each said value of said modulation voltage (Vm(i)) in said data file (44), in turn, and obtaining a plurality of values of corrected modulation voltages (Vm(i)') for each value of said modulation voltage (Vm(i)) associated with each one of said modulation electrodes (22); storing each said value of corrected modulation voltage (Vm(i)') in said data file (44); and retrieving each value of said corrected modulation voltage (Vm(i)') for each desired value of said modulation voltage (Vm(i)) from said data file (44) and applying each value of said corrected modulation voltage (Vm(i)') to each one of said modulation electrodes (22) associated therewith, thereby adjusting said ion current (20) at each one of said modulation electrodes (22) to a uniform value.

14. A method of correcting in situ the non-uniformity of density of an ion flow from an ionographic print head (10) having a source of ions moving in a stream through a modulation channel (24) in which a print array (16) of modulation electrodes (22) is positioned and individually biased by a modulation voltage (Vm(i)) to modulate said stream, projected from said print head (10) as an ion current (20) to form a charge image on a dielectric surface of an electroreceptor, comprising the steps of;

providing an ion sensor (36) having a negatively-biased calibration electrode (32) said calibration electrode (32) having a length dimension much greater than a width dimension across several of said modulation electrodes (22), being positioned adjacent to and aligned along a length dimension of said modulation channel (24), and insulated therefrom;

providing a current-to-voltage conversion device (38) having an ion current input line (39) and having an output of ion current data (40), said ion current input line (39) being connected to said calibration electrode (32);

providing a feedback circuit (42) having an input coupled to said current-to-voltage device (38), having a first output coupled to said switching circuits (52) and a second output coupled to said storage means (44), and pro as an output, a fixed value of calibration modulation voltage (Vm(0));

providing a switching circuit (52) programmed to address and modulate one of said modulation electrodes (22);.

providing an electronic data storage file (44), programmed by computer software, in which to store values of calibration modulation voltage (Vm(0)) and associated values of ion current data (40);

providing an electronic data processor (46), being coupled to said electronic data storage file (44) and programmed to apply a correction by a correction algorithm to each said value of ion current date (40) stored in said electronic data storage file (44), each said correction producing a corresponding value of corrected modulation voltage (Vm(i)'); and providing an electronic data processor (48) programmed to retrieve said values of corrected modulation voltage (Vm(i)');

addressing each one of said modulation electrodes (22) step-wise, one modulation electrode at a step, beginning with a first group (60) and ending with a last group (61) of modulation electrodes (22), and applying a desired, fixed value of calibration modulation voltage (Vm(0)), simultaneously modulating all other said modulation electrodes (22) not being addressed, with a maximum value of modulation voltage blocking said ion current (20) therefrom, and traversing said print array (16) step-wise in a like manner until said last group (61) has been addressed and modulated with said modulating voltage (Vm(0)), producing a value of said ion current (20) associated with each modulation electrode (22) for calibration purposes;

sensing said ion current (20) with said calibration electrode (32), conducting said ion current (20) to said current-to-voltage conversion device (38) and producing an output of ion current date (40) indicative of each value of said ion current (20) sensed;

storing each value of said ion current data (40) associated with each said modulation electrode (22) being addressed in an electronic data storage file (44);

applying a programmed algorithm in said data processor (46) to each value of said ion current data (40) in said electronic data storage file (44), in turn, and obtaining a value of corrected said modulation voltage (Vm(i)') for each value of said ion current (20) associated with each said modulation electrode (22);

storing each said value of corrected modulation voltage (Vm(i)') in said electronic data storage file (44);

retrieving each value of said corrected modulation voltage (Vm(i)') for each desired value of said calibration modulation voltage (Vm(0)) from said data file (44) and applying each value of said corrected modulation voltage (Vm(i)') to each said modulation electrode (22) associated therewith, thereby adjusting said ion current (20) at each said modulation electrode (22) to a uniform value.

* * * * *

UNITED STATES PATENT AND TRADEMARK OFFICE
CERTIFICATE OF CORRECTION

PATENT NO. : 5,087,933
DATED : February 11, 1992
INVENTOR(S) : Richard G. Stearns It is certified that error appears in the above-indentified patent and that said Letters Patent is hereby corrected as shown below:

On the title page, Item [54]: line 1, "INONOGRAPHIC" should be --IONOGRAPHIC--.

On the title page, Other Publicatuon, line 1: "Inographic" should be --Ionographic--.

On the title page, Column 2, line 24-25: "Corrected values of modulation voltage a switching circuit (52)." should be deleted.

Column 1, line 1, "INONOGRAPHIC" should be --IONOGRAPHIC--.
Column 6, line 31, "through electronic" should be --through an electronic--.
Column 6, line 32, "the" should be --a--.
Column 13, line 39, "(Vm(i),)" should be --(Vm(i)),--.
Column 14, line 32, "pro" should be --producing--.
        line 35, "one" should be --each one--.
        line 44, "date" should be --data--
Column 15 line 2, "date" should be --data--

Signed and Sealed this

Second Day of November, 1993

Attest:

BRUCE LEHMAN

Attesting Officer      Commissioner of Patents and Trademarks